(12) United States Patent
Tokuno (10) Patent No.: US 6,389,328 B1
(45) Date of Patent: May 14, 2002

(54) METHOD OF AND APPARATUS FOR ATTRACTING AND CONVEYING CONVEYABLE OBJECTS AND PROCESS OF AND SYSTEM FOR CHECKING IN AN EATING ESTABLISHMENT

(75) Inventor: Nobuo Tokuno, Ishikawa-gun (JP)

(73) Assignee: Nippon Crescent Co., Ltd., Ishikawa-ken (JP)

( * ) Notice: Subject to any disclaimer, the term of this patent is extended or adjusted under 35 U.S.C. 154(b) by 0 days.

(21) Appl. No.: 09/610,360

(22) Filed: Jul. 5, 2000

(30) Foreign Application Priority Data

Sep. 13, 1999 (JP) ............................................ 11-258668
Mar. 3, 2000 (JP) ............................................ 12-058380

(51) Int. Cl.⁷ ................................................. G06F 7/00
(52) U.S. Cl. ..................... 700/230; 700/228; 198/860.4; 186/1
(58) Field of Search ........................................ 700/230

(56) References Cited

U.S. PATENT DOCUMENTS 3,161,292 A    12/1964   Dalen (List continued on next page.)

FOREIGN PATENT DOCUMENTS

| JP | 3-109697 | * | 5/1991 | ............ | G07F/11/70 |
|----|----------|---|--------|--------------|------------|
| JP | 8-112172 | * | 5/1996 | ............ | A47G/23/08 |
| JP | 10-215998 | * | 8/1998 | ............ | A47G/23/08 |
| JP | 11-46956 | * | 12/1998 | ............ | G07F/11/70 |
| JP | 10-317699 | * | 12/1998 | ............ | A47G/23/08 |
| JP | 11-169275 | * | 6/1999 | ............ | A47G/23/08 |
| JP | 11-253295 | * | 9/1999 | ............ | A47G/23/08 |

*Primary Examiner*—Christopher P. Ellis
*Assistant Examiner*—Michael E Butler (74) *Attorney, Agent, or Firm*—Wenderoth, Lind & Ponack, L.L.P.

(57) ABSTRACT

A method of and apparatus for conveying a conveyable object is disclosed whereby the object (W) attracted at a conveying start site (A) by suction to an attractor means (12) carried by a conveyer arm (14) and conveyed by the conveyer arm (14) while being retained by suction to the attractor means (12) is instantaneously detached from the attractor means (12) at an object conveying destination site (B). To attract the object (W) and to hold it retained to the attractor means (12), an attractor plate (32) having fastened thereto the attractor means (12) and attached to a lower end of an inner cylinder (28) that extends in the outer cylinder (20) is held in a vacuum contact with a head plate (24) attached to a lower end of an outer cylinder (20) carried by a conveyer arm (14) in which a vacuum communication is established of the attractor means (12) with a suction source (16) via the attractor plate (32), the head plate (24) and suction hose means (22). At the conveying destination site (B), the attractor plate (32) carried by the descending inner cylinder (28) with a release roller (36) guided by a release cam guide (46) is detached from the head plate (24) carried by the outer cylinder (20) held stationary to instantaneously beak the vacuum communication and release the conveyed object (W) from suction retention to the attractor means (12). In the checking system, data are stored in a computer (68) for the colors (62) of merchandise item plates (60) for their respective kinds and/or prices. The plates (60) consumed by a guest for checking are placed one on top of another in the plate (object) conveying start side (A). The sensor (64) to read a color of the consumed merchandise item plate (60). The computer (68) collates data for the colors, read by the sensor (64) and collate the stored data with the pre-stored data for the colors of merchandise item plates for their respective kinds and/or prices to determine the number and the charge of the consumed plates (60) for each of the kinds and/or prices, and to compute a total charge therefrom.

4 Claims, 8 Drawing Sheets

U.S. PATENT DOCUMENTS

| | | | | |
|---|---|---|---|---|
| 4,074,793 A | * | 2/1978 | Yuter | 186/1 |
| 4,190,134 A | * | 2/1980 | Kato | 186/49 |
| 4,349,086 A | * | 9/1982 | Yamada | 186/49 |
| 4,560,032 A | * | 12/1985 | Imanak | 186/38 |
| 4,637,773 A | | 1/1987 | Nakashima et al. | |
| 4,977,823 A | | 12/1990 | Kuwahara | |
| 5,477,778 A | | 12/1995 | Kuwahara | |
| 6,145,628 A | * | 11/2000 | Tanaka | 186/50 |
| 6,179,088 B1 | * | 1/2001 | Lai | 186/49 |
| 6,260,694 B1 | * | 7/2001 | Sasahara | 198/860.4 |

* cited by examiner

METHOD OF AND APPARATUS FOR ATTRACTING AND CONVEYING CONVEYABLE OBJECTS AND PROCESS OF AND SYSTEM FOR CHECKING IN AN EATING ESTABLISHMENT

TECHNICAL FIELD

The present invention relates to a method of and an apparatus for attracting and conveying conveyable objects, the construction of which method and apparatus is simple and makes it unnecessary to turn a suction source on and off or to use an on-off valve, and by which a conveyable object conveyed can be released instantaneously from suction retention.

The present invention also relates to a checking process and system in an eating establishment for automatically checking, i. e., automatically determining a total charge to a guest for the merchandise item dishes the guest consumed, advantageously by using a conveyable object attracting and conveying apparatus as described.

BACKGROUND ART

So far in conveying a conveyable object, it has been known to use a technique in which the object is first attracted by suction at a conveying start side, then conveyed while held attracted by suction and finally detached by releasing it from suction retention at a conveying destination site. To do this, it has been customary to make use of what is commonly called a conveyer arm that carries a suction means to which a suction force produced by a suction or vacuum source is transmitted.

To selectively turn on and off the suction force at the suction means, one known method employs an arrangement in which the conveyer arm is associated with an air cylinder whose operation is controlled by an electromagnetic valve to displace the attractor means vertically or horizontally relative to the conveyer arm to make suction selectively active and inactive at the attractor means. Another known technique has adopted an on-off valve disposed between the attractor means and a vacuum pump and operable to selectively connect to and disconnect from the vacuum source the attractor means. In a further known arrangement a vacuum source or pump is directly switched on and off so that a suction force selectively develops and disappears at the attractor means.

It has been recognized that all these known techniques and arrangements make it unavoidable to entail relatively complex mechanisms and necessitate a large number of component parts; hence the equipment becomes unavoidably large sized and costly.

It has also be found that in removing a suction force at the attractor means the use of an on-off valve or a circuit to switch a suction produced at the vacuum source fails to reduce pressure at the attractor means to an atmospheric level or the suction force thereat to zero instantaneously. Thus, a conveyed object becomes unable to detach from the attractor means without delay or failure upon its arrival at its site of conveyance destination.

Further, the lack of any active means to forcively detach automatically in these prior systems has been found to make detachment uncertain.

As regards the subject of an eating establishment, for example, especially in those with a rotary catering table system installed therein having a crescent chain conveyer (i. e., a looped chain of serially connected crescent shaped plates) disposed in a top area of a base stand for conveying servable merchandise food items around a loop, it has been customary that servable merchandise items which are typically "sushi" (vinegared rice with fish or vegetables in the form of rolls, slices, oval-shaped and others) items as loaded or placed on merchandise food items plates are offered to guests. Merchandise item plates are provided with colors designed to identify servable merchandise items to be loaded or placed thereon. In checking, i. g., determining a charge to a guest, a service worker in the shop or restaurant confirms the merchandise items that the guest consumed by the colors of the emptied merchandise item plates and in person computes with a cash register the charge which is submitted to the guest and the guest then pays for at the cashier.

In confirming the colors and computing a charge, the service worker must deal with a large number of emptied or consumed merchandise item plates piled up on the table or counter for each of the guests who are leaving. As a result, checking becomes time consuming, requiring the guests to be kept waiting for long at the cashier.

In such shops or restaurants, it has in the recent times become an increased practice to use disposable, paper made tableware such as paper plates in order to reduce expenses including labor costs, the cost of equipment and expenses for water and energy that incur, inter alia in washing tableware for reuse.

Such throwaway tableware such as paper plates are lighter in weight than ordinary plastic made merchandise item plates and when disposed of as a garbage in a trash or the like tend to overlay each other to produce a complicated and voluminous mass or masses in it. They must be compressed by the worker's hands and feet to reduce their volumes and to leave the trash enough open and easier to accept a next garbage.

There have been strong demands in the restaurant or food dispensing business for a technique that enables a checking operation in a restaurant or eating house to be accomplished instantaneously both to the advantages of the restaurant or house and guests or customers and which facilitates collecting and/or disposing guests' emptied or consumed merchandise item plates to the advantages of service workers in the eating establishment.

DISCLOSURE OF INVENTION

It is accordingly an important object of the present invention to provide a method, apparatus, and system that meet with a these demands and that overcome the above mentioned problems met in the prior art.

It is an object of the present invention to provide a method of attracting and conveying a conveyable object that enables an conveyed object held attracted to be released instantaneously.

It is another object of the present invention to provide a conveyable object attracting and conveying apparatus that is simpler in structure, more compact and less costly than the existing apparatus.

It is an object of the present invention to provide a process of and a system for checking in an eating establishment which permits a checking operation by a service worker for a guest or customer to be accomplished instantaneously and yet facilitating collection or disposition of consumed merchandise item plates.

In order to achieve the objects mentioned above there is provided in accordance with the present invention in a first aspect thereof a method of attracting a conveyable object by suction to an attractor means and conveying the so attached conveyable object by a conveyer arm, which method comprises the steps of: moving the conveyer arm towards an object conveying start side while guiding downwards with a guide cam disposed towards the object conveying start side, a cam roller attached to an front side surface of an external cylinder biased with a biasing means to assume an upper limit position thereof and thereby causing the external cylinder to descend together with an internal cylinder disposed in the external cylinder and biased upwards with a biasing means; in the object conveying start side, attracting a conveyable object by suction to the attractor means of an attractor plate disposed at a lower end of the internal cylinder, the attractor means providing a suction force sufficient to attract the conveyable object thereto by being then in suction communication with a suction source via the attractor plate, a head plate attached to a lower end of the external cylinder, and a suction hose means connecting to the suctions source; and thereafter moving the conveyer arm towards an object conveying destination side while guiding downwards with a release guide cam disposed towards the object conveying destination side, a release roller attached to a rear side surface of the internal cylinder as movable on a rear side surface of the external cylinder and thereby causing the attractor plate having the attractor means to descend to separate, in the object conveying destination side, the attractor plate from the head plate, thereby removing the suction force provided by the attractor means and releasing the conveyed object from suction retention.

Preferably, the method further comprises the steps of providing a release bar that is axially supported to normally extend essentially horizontally with its base and mid portions lying on a plane below the rear surface of the attractor plate and at positions corresponding to one end and midway of the rear surface of the attractor plate in the direction of its width, the release bar having its free end portion extending from the other end of the rear surface of the attractor plate in the direction of its width; and causing the release bar to turn on a mid point, as fulcrum, of the plane below the rear surface of the attractor plate to cause said free end portion to hit on the conveyed conveyable object being detached, thereby aiding its detachment from the attractor means, thus to ensure an instantaneous release of its retention by suction to the attractor means.

The present invention also provides in a second aspect thereof an apparatus for attracting a conveyable object by suction to an attractor means and conveying the so attached conveyable object by a conveyer arm, which apparatus comprises: a conveyer arm for conveying a conveyable object; an external cylinder mounted to the conveyer arm and biased with a biasing means to assume an upper limit position relative to the conveyer arm; a head plate attached to a lower end of the external cylinder, the head plate having fastened thereto a suction hose means connected to a suction source; an internal cylinder disposed in the external cylinder and biased upwards by a biasing means; an attractor plate attached to a lower end of the internal cylinder, the attractor plate having an attractor means fastened thereto; a cam roller attached to a front side surface of the external cylinder; a release roller attached to a rear side surface of the internal cylinder as movable on a rear side surface of the external cylinder; a guide cam disposed towards a conveyable object conveying start side for guiding the cam roller downwards; and a release guide cam disposed towards a conveyable object conveying destination side for guiding the release roller.

Preferably, the apparatus further comprises: a release bar that is axially supported to normally extend essentially horizontally with its base and mid portions lying on a plane below the rear surface of the attractor plate and at positions corresponding to one end and midway of the rear surface of the attractor plate in the direction of its width, the release bar having its free end portion extending from the other end of the rear surface of the attractor plate in the direction of its width, the release bar being adapted to turn on a mid point, as fulcrum, of the plane below the rear surface of the attractor plate to cause said free end portion to hit on the conveyed conveyable object being detached, thereby aiding its detachment from the attractor means, thus to ensure an instantaneous release of its retention by suction to the attractor means.

It can readily be appreciated that an attracting and conveying apparatus according to the present invention permit a conveyed object held attracted to be released instantaneously and provide for an excellent suction retention releasability.

Also, effecting conveyance movement of a conveyer arm and motions to cause the attractor means mechanically by means of biasing means and cam roller and guide cam means renders the apparatus structure extremely simple and the apparatus itself compact to the extent that the cost of installation and its running cost are drastically reduced.

Also, a release bar optionally provided in accordance with the present invention effectively serves to aid its detachment of a conveyed object from the attractor means and thus to ensure an instantaneous release of its retention by suction to the attractor means.

The present invention further provides in a third aspect thereof a checking process in an eating establishment, which process comprises the steps of: a) providing merchandise item plates on surfaces thereof with colors, patterns or colored patterns that identify kinds and /or prices of merchandise items for loading thereon; b) pre-storing in a computer data for the colors, patterns or colored patterns of merchandise item plates in relation to their respective kinds and/or prices; c) loading the merchandise item plates of colors, patterns or colored patterns with merchandise items whose kinds and/or prices are identified by the colors, patterns and colored patterns, thereby offering the merchandise items; for checking by a guest paying a charge for merchandise item plates the guest consumed, d) placing the consumed merchandise item plates one on top of another in a plate conveying start side; e) causing an attractor means carried by a conveyer arm to attract by suction thereto each of the consumed merchandise item plates so placed; f) causing the conveyer arm to convey the consumed merchandise item held attracted and retained by the attractor means from the plate conveying start side towards a plate conveying destination side; g) in the plate conveying destination side, releasing the consumed merchandise item plate conveyed from suction retention by instantaneously removing suction at the attractor means to permit the released merchandise item plate to detach from the attractor means; h) during the steps e), f) and g), causing a sensor to read a color, pattern or colored pattern of the consumed merchandise item plate; i) repeating the steps e) to h) for all the consumed merchandise item plates in the plate conveying start side; and j) in the computer, storing data for the colors, patterns or colored patterns read by the sensor identifying and collating the stored data with the pre-stored data for the colors, patterns and colored patterns of merchandise item plates in relation to their respective kinds and/or prices to determine the number and the charge of the consumed merchandise item plates for each of the kinds and/or prices, and to compute a total charge therefrom.

Preferably, a storage casing is disposed in the plate conveying destination side for accepting the consumed merchandise item plates detaching in the step g) so that they are placed snugly one on top of another in the casing.

The present invention also provides in a fourth aspect thereof a checking system in an eating establishment, which comprises: merchandise item plates provided with colors, patterns or colored patterns that identify merchandise items for loading thereon; an attractor means carried by a conveyer arm for attracting by suction each of the consumed merchandise item plates to permit the conveyer arm to convey the consumed merchandise item plate held retracted by suction to and retained by the attractor means from a plate conveying start site to a plate conveying destination side; a suction removal means associated with the conveyer arm and operable at the plate conveying destination site to instantaneously remove suction to the attractor means to permit the consumed merchandise item plate conveyed to detach from the attractor means and to detach from the attractor means; a sensor means associated with the conveyer arm for sensing the colors, patterns or colored patterns of the merchandise item plates; and a computer for pre-storing data for colors, patterns or colored patterns of merchandise item plates in relation to their respective kinds and/or prices, the computer being associated with the sensor means for storing data for the colors, patterns or colored patterns sensed by the sensor means and collating the stored data with the pre-stored data for colors, patterns or colored patterns of merchandise item plates in relation to their respective kinds and/or prices to compute the number of the consumed merchandise item plates for each of the kinds and/or prices corresponding to the colors, patterns or colored patterns sensed by the sensor means and to determine from such charges a total charge to be billed to the guest.

Preferably, the system further includes a storage casing disposed in the plate conveying destination site for accepting consumed merchandise item plates each conveyed by the conveyer arm and detached from the attractor means in a manner such that the plates are placed snugly one top of another in the storage casing.

It can readily be seen that the checking process and system according to the present invention permit a charge determination and computation and hence a checking to be effected in a moment.

Thus, the process and system also totally eliminate the loads on service workers in an eating establishment to classify and then compute different consumed dishes individually and sharply reduces job requirements entailed in checking in an eating establishment.

Also, providing a storage casing or container in the plate conveying destination side for loading with consumed and conveyed merchandise item plates as placed one on top of another eliminates altogether a service worker's requirement to dispose consumed merchandise item plates paid for individually. In addition, the ability of the system to allow consumed merchandise item plates to be laid snugly one on top of another in the storage casing enables these consumed plates to be thrown away into a trash or a garbage bag in a sufficiently small volume. It also eliminates altogether the troubles so far met to compress the volume of a garbage of this sort which has hitherto become unnecessarily large when it is disposed or thrown away is thus eliminated altogether. In addition, it serves to reduce total volumes of masses of garbage and to resolve environmental problems.

These and other features, objects and advantages of the present invention will become more readily apparent to those of ordinary skill in the art from the following detailed description of the preferred forms of embodiment thereof as illustrated in the various drawing Figures.

BRIEF DESCRIPTION OF DRAWINGS

In the accompanying drawings.

BEST MODES FOR CARRYING OUT THE INVENTION

Referring to FIGS. 1 to 5, there is shown an attracting and conveying apparatus 10 implemented in a certain preferred form in accordance with the present invention. The attracting and conveying apparatus 10 is designed to include an attractor means 12 for attracting a conveyable object W thereto by applying a suction to the conveyable object W, and a conveyer arm 14 that carries the attractor means 12 for conveying the conveyable object W attracted to the attractor means 12.

In the illustrated form of implementation, the attractor means 12 comprises four (4) attractor members each in the form of a resin made hollow pad.

Figure 6:
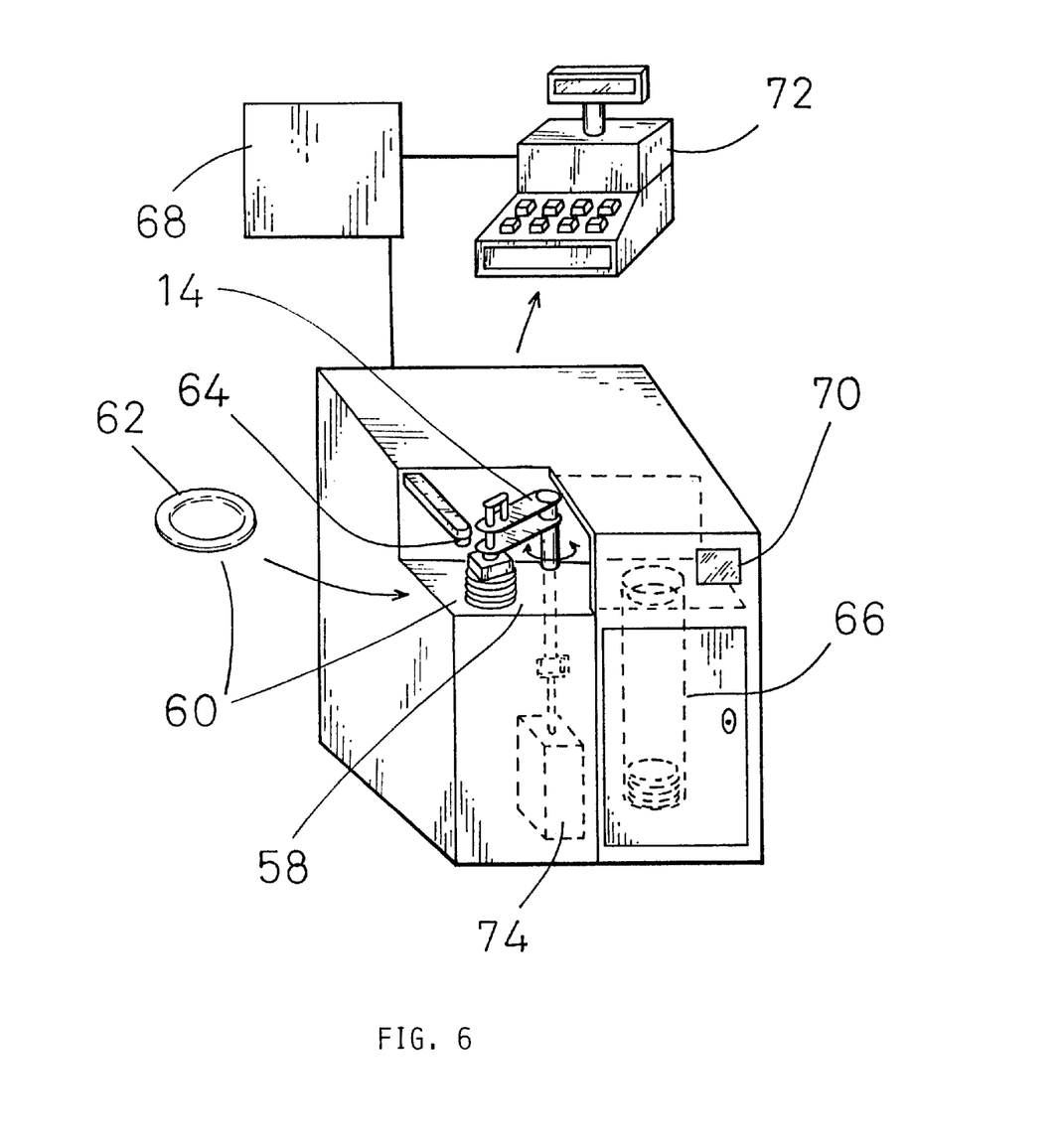
FIG. 6 is a perspective view that illustrates a checking system in an eating establishment, using the attracting and conveying apparatus, according to the present invention.

In the form of implementation illustrated, movements of the conveyer arm 14 for conveyance are effected by turning the conveyer arm 14 about or with respect to a main shaft or spindle (illustration omitted) by using a drive motor (as indicated by reference character 74 in FIG. 6).

Figure 2:
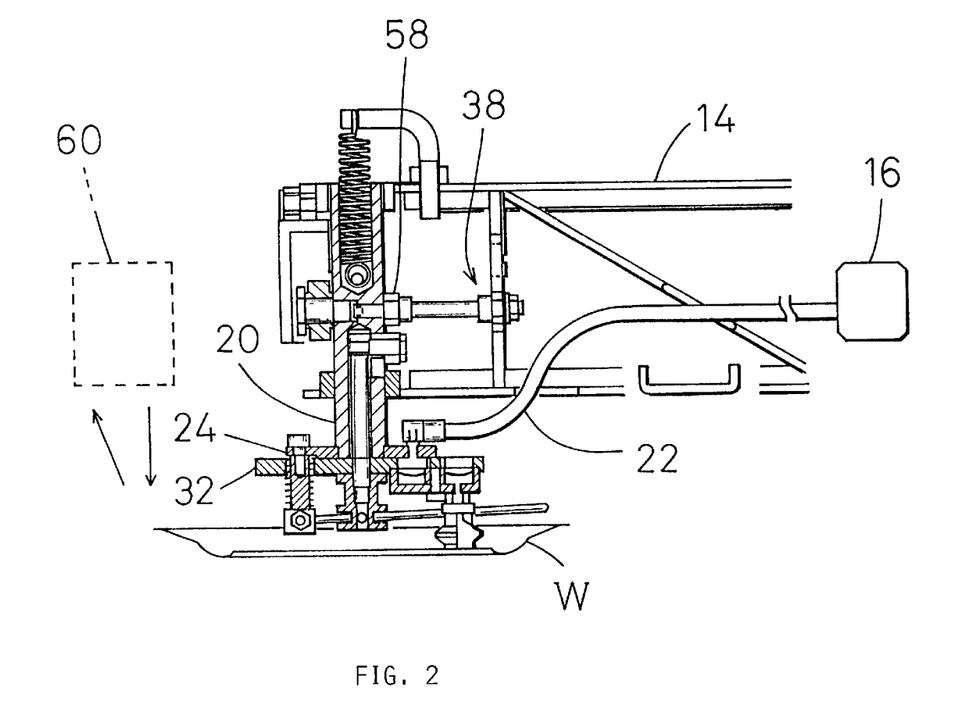
FIG. 2 is a side view that illustrates the attracting and conveying apparatus shown in FIG. 1.

The force of attraction, viz., the force of suction that develops at the attractor means 12 and which it applies to the conveyable object W is here produced by a suction source 16 constituted by a vacuum pump shown in FIG. 2. As illustrated, the four hollow suction members or pads 12 are arranged to communicate with the vacuum pump 16.

Figure 3:
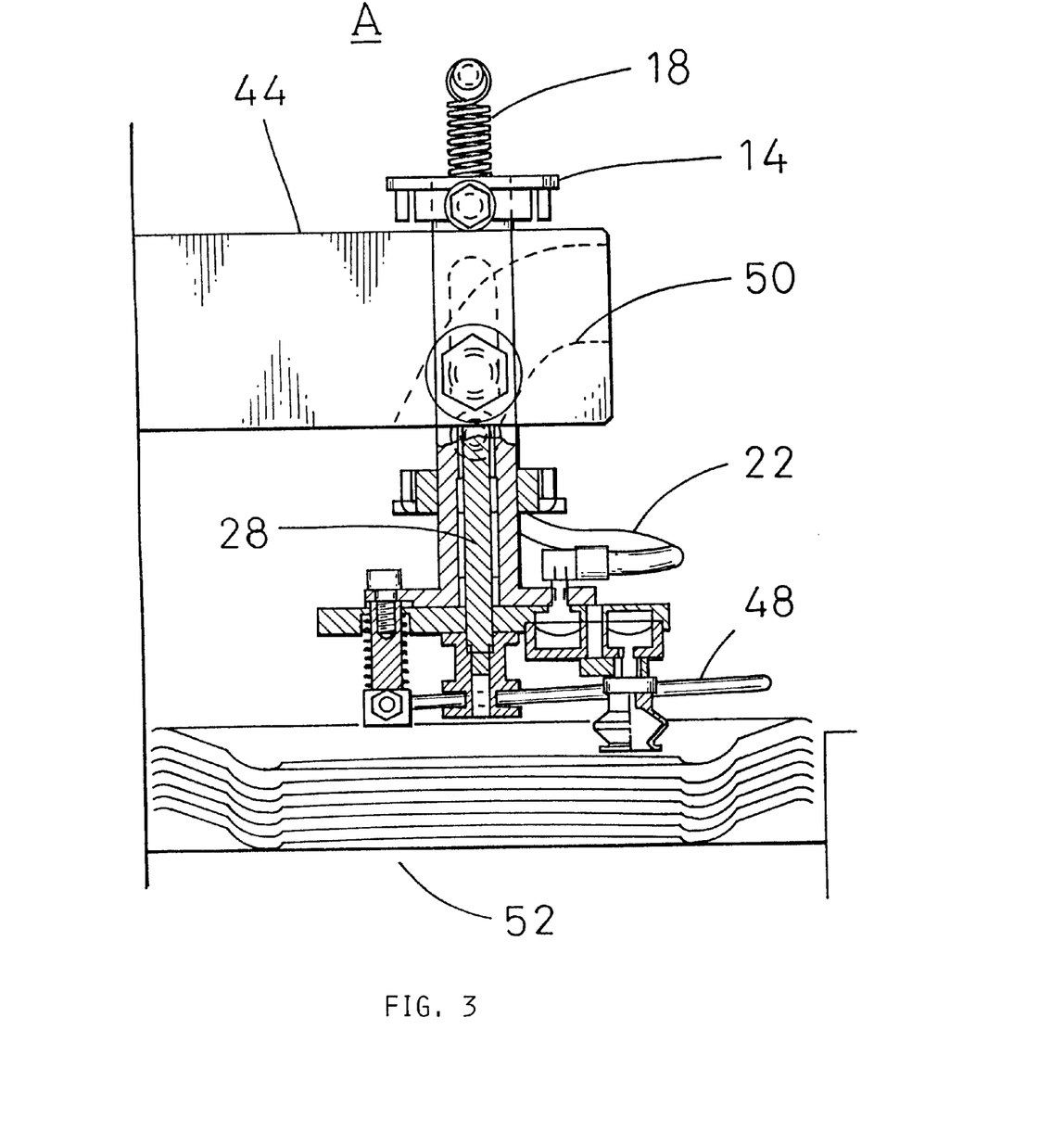
FIG. 3 is a front view that illustrates a step in which a conveyable object is being attracted by suction.
Figure 4:
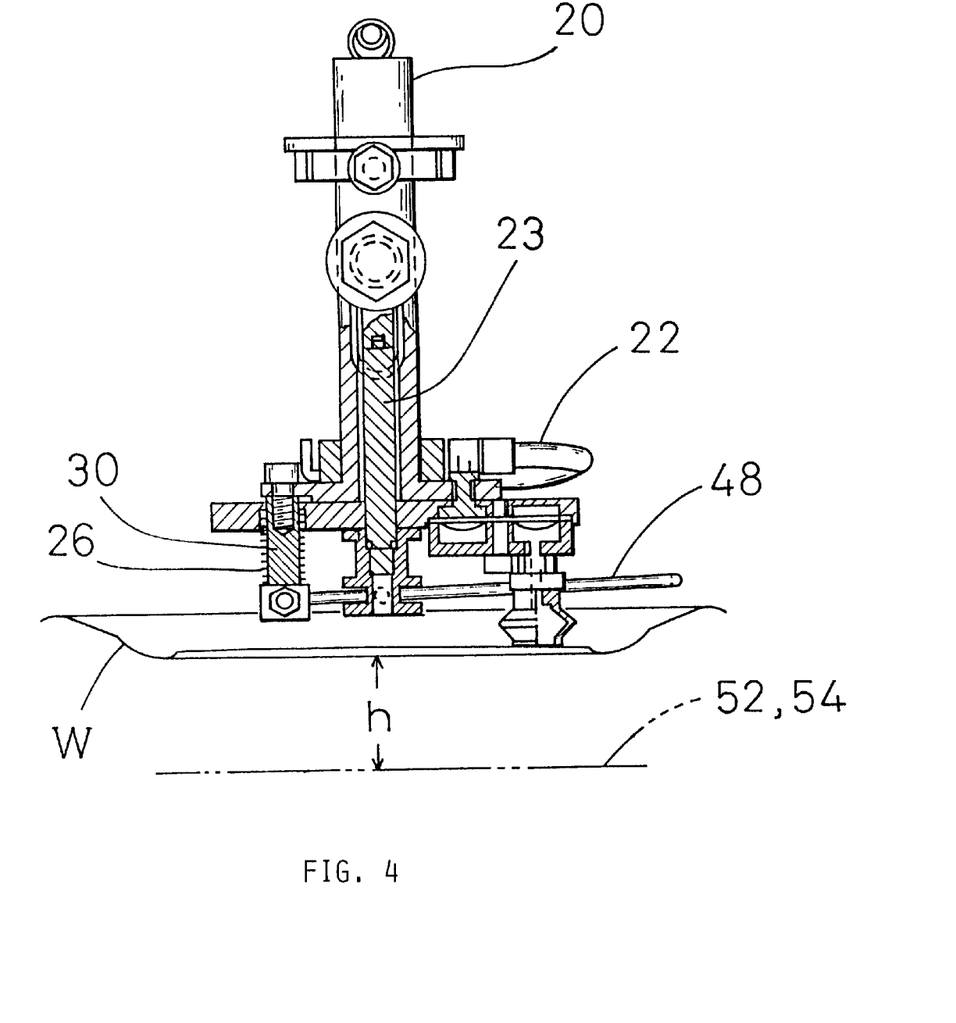
FIG. 4 is a front view that illustrates a step in which the conveyable object retained by suction is being conveyed.
Figure 5:
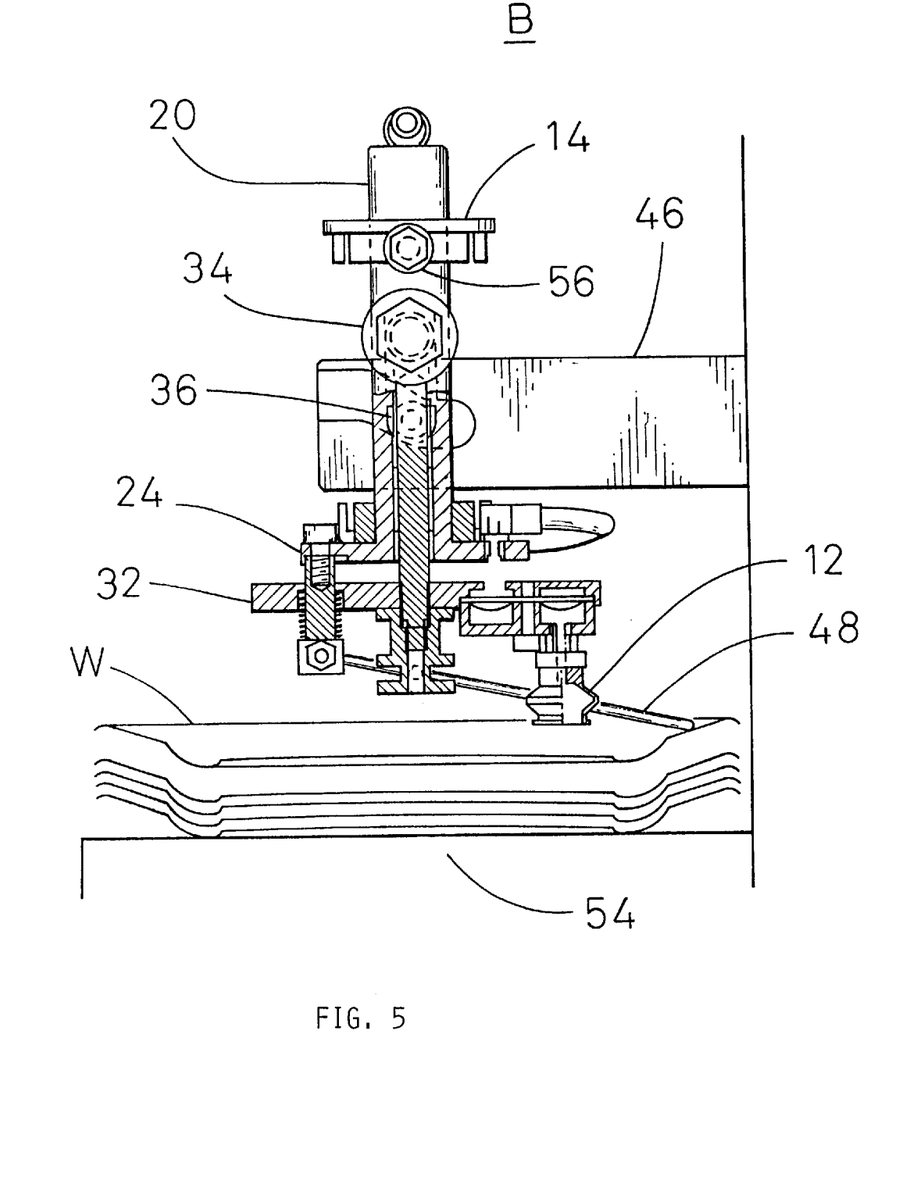
FIG. 5 is a front view that illustrates a step in which the conveyable (conveyed) is being released from suction retention.

Typically, the conveyable object W as illustrated in FIGS. 2 and 4 is a paper made plate which has in the recent years been increasingly in use in an eating place or establishment. In FIGS. 3 and 5, a number of such paper plates are illustrated as conveyable objects W placed one top of another or in a stack thereof.

Figure 1:
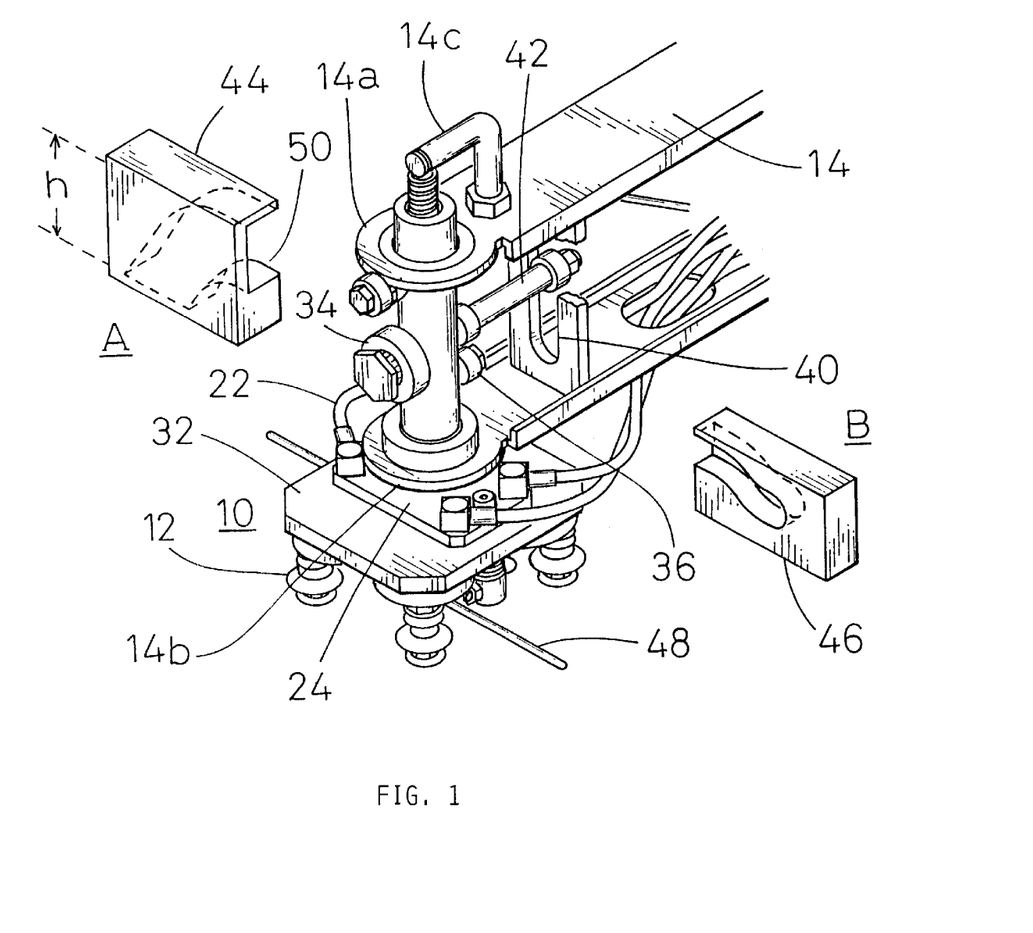
FIG. 1 is a perspective view that illustrates an attracting and conveying apparatus according to the present invention.

The conveyer arm 14 as shown in FIGS. 1 and 2 is provided with a pair of horizontal and parallel bored extensions 14a and 14b through which in a slide fit therewith, there vertically extends an external cylinder 20. The external cylinder 20 is shown held in place by means of a first biasing means 18 to lie at its upper limit position. As illustrated, the biasing means 18 may comprise a spring interposed and retained between a horizontal end portion of an L-shaped upward projection 14c of the conveyer arm 14 and an upper end of the external cylinder 20.

The external cylinder 20 has a lower end portion that carries a head plate 24 having a suction hose means 22 fastened thereto and connected to the suction source 16. In the form of embodiment illustrated, the suction hose means 22 comprises four (4) suction hoses corresponding to the four (4) suction and thus attracting members 12. Thus, each of the four suction hoses 22 has its one end connected to the suction source 16 and its other end fastened to the head plate 24.

An internal cylinder 28 is also provided as extending in the external cylinder 20 coaxially therewith. The internal cylinder 28 has a lower end portion that carries a suction or attractor plate 32 having the attractor means 12 fastened thereto. Thus, with the suction hoses 22 fastened to the head plate 24, the four suction or attracting members 12 fastened to the attractor plate 32 may be provided with respective vacuum communications with the suction source 16 through the attractor plate 32, the head plate 24 and the suction hoses 22, respectively.

A steady or fast pin 30 is shown penetrating the attractor plate 32 from the side of the head plate 24.

The internal cylinder 28 is held in place by means of a second biasing means 26 to lie at an upper position thereof. In the form of embodiment illustrated, the biasing means 26 comprises a spring interposed between a rear surface of the attractor plate 32 and a lower end edge portion of the steady or fast pin 30 that extends below the attractor plate 32.

Thus, the attractor plate 32 carried by the internal cylinder 28 and carrying the attractor members 12 is biased upwards by the biasing spring 26 to come into close or vacuum contact with the head plate 24. In this state in which the attractor or suction members 12 lie in vacuum communication with the ends of the corresponding suction hoses 22 fastened to the head plate 24, a suction force is held applied in the attractor members 12.

The external cylinder 20 is provided on the front side of its outer, cylindrical surface with a cam roller 34 attached thereto. The internal cylinder 28 is provided on the rear side of its outer, cylindrical surface with a release roller 36 attached thereto. In this form of embodiment illustrated, the release roller 36 is designed to move with the internal cylinder 28 on the rear cylindrical surface of the external cylinder 20 in and along a long hole (illustration omitted) formed in the rear cylinder surface of the external cylinder 20.

The internal cylinder 28 is vertically moved relative to the external cylinder 20 in order to forcibly detach the attractor plate 32 attached to the lower end of the internal cylinder 28 from the head plate 24 attached to the lower end of the external cylinder 20 to break vacuum communication between the suction hose means 22 and the attractor suction means 12 and to place the attractor suction means 12 in an atmospheric pressure, thereby instantaneously removing the suction force from the attractor means 12.

As shown in FIGS. 1 and 2, between the conveyer arm 14 and the external cylinder 20 there is provided a rotation inhibiting means 38 for inhibiting rotation of the external cylinder 20. In the form of embodiment illustrated, the rotation inhibiting means 38 as shown in FIG. 2 has a construction that as shown in FIG. 1 a long hole 40 is formed in the conveyer arm 14 in which is fitted a rotation inhibiting bar 42 that extends horizontally from a rear side portion of the cylindrical surface of the external cylinder 20.

In a conveyable object W supply side, that is indicated by reference character A in FIG. 1, where the conveyer arm 14 is designed to start conveying the conveyable object W, there is disposed a guide cam 44 with a guide surface 50 for guiding the cam roller 34 of the external cylinder 20 to move downwards and guiding the external cylinder 20 together with the internal cylinder 28 to move downwards.

In a conveyable object W destination side, that is indicated by reference character B in FIG. 1, where the conveyer arm 14 is designed to end conveying the conveyable object W, at a position that is lower than the position at which the guide cam 44 lies, there is disposed a release guide cam 46 for guiding the release roller 36 of the internal cylinder 28 and hence the latter to move downwards.

FIG. 1 also shows a release bar 48 provided to forcibly detach the conveyable object W and move it downwards. As shown in FIGS. 3 and 4, the release bar 48 is axially supported with its base and mid portions lying at one end and midway of the rear surface of the attractor plate 32 in the direction of its width. The release bar 48 has a free end portion thereof extending from the other end of the rear surface of the attractor plate 32 in the direction of its width.

In operation, with the internal cylinder 28 guided by the release guide cam 46 to move downwards, consequential downward movement of the attractor plate 32 causes the release bar 48 to turn or rotate on a mid point, as a fulcrum, of a plane below the rear surface of the attractor plate 32 in the direction of its width. As seen in FIG. 5, the release bar 28 is then rotated clockwise to cause its free end at the right hand side to move downwards and to hit on the conveyable object W, thereby aiding its detachment from the attractor means 12. Thus, instantaneous release of retention by suction to the conveyed object W is ensured.

Here, the release bar 28 is pivoted with its base end fixed in position at a lower end of the fast or steady pin 30 secured to the head plate 24, it can be stated that the internal cylinder 28 when descending relative to the external cylinder 20 causes the release bar 48 supported by a lower end portion of the internal cylinder 28 and so supported normally to extend in a horizontal direction, to gyrate or on that base end clockwise, turning its free end downwards.

The so gyrating or turning release bar 48 causes its free end to hit on the conveyable object (now conveyed) W and assists in detaching it from the attractor means 12. The release of a conveyable (conveyed) object W from the suction attractor means 12 is thus ensured by the release bar 48.

In the Figures there are also shown a lifting table 52 for successively lifting conveyable objects W placed in a stack thereon, a storing table 54 for accepting and storing thereon the conveyable (conveyed) objects W successively lowered and coming, a first back face roller attached to the conveyer arm 14 so as to roll over the guide cam 44 for.

In FIG. 2, a plurality of conveyable objects W are shown placed in a stack or one on top of another on a lifting table 52 for lifting them successively in the conveying start side A. In FIG. 5 such objects W are shown in the conveying destination side B as now having been conveyed and each upon detachment being placed and stored in a stack on a storing table 54.

The conveyer arm 14 is prevented from possible deflection in two ways, i. e., by two back face rollers attached to the conveyer arm 14. The first of them, indicated by reference character 56 in FIG. 5 is adapted to roll over the upper surface of the guide cam 44 by which the cam roller 34 attached to the external cylinder 20 is guided while the conveyer arm 14 is being moved towards the conveying start side A. The second back face roller, indicated by reference character 58 in FIG. 2, is adapted to roll over the upper surface of the release guide cam 46 by which the release roller 36 is guided to move while the conveyer arm 14 is moving towards the conveying destination side B.

An explanation in detail is given in respect of a method of attracting and conveying a conveyable objects W by using the attracting and conveying apparatus described.

As shown in FIG. 1, the conveyer arm 14 initially lies at a position that is midway between the side A in which the conveyer arm 14 starts conveying a conveyable object W and the conveying destination side B that is the side in which the conveyer arm 14 ends conveying the conveyable object W. The conveyer arm 14 is now ready to move towards the conveying start side B.

Then, with the internal cylinder 28 biased upwards by means of the biasing means 26, the attractor or suction plate 32 fastened to the lower end of the internal cylinder 28 is biased into and thereby held in a close or vacuum contact with the head place 24 fastened to the lower end of the external cylinder 20 to bring the attractor suction means 12 into and thereby hold it in a vacuum communication with the vacuum hose means 22 fastened to the head plate 24. In this state a force of suction always is held to exist and remains active or at work in the attractor or suction means 12.

Also in that state, the external cylinder 20 is biased by the biasing means 18 to assume its upper limit position, together with the internal cylinder 28, with respect to the conveyer arm 14.

Then, while the conveyer arm 14 is being moved from its initial position towards the conveying start side A, the cam roller 34 attached to the front side of the external cylinder 20 as shown in FIG. 3 is guided by the guide cam 44 and moved to follow the guide surface 50, thereby lowering the external cylinder 20 together with the internal cylinder 28. Then, the external cylinder 20 is moved by or against the biasing force exerted thereon by the biasing means 18 to descend by a distance indicated in FIGS. 1 and 4 by reference character h, which is, say, around 60 mm, i. e., until the attractor suction means 12 moved with the external cylinder 20 comes into close proximity to or into contact with a conveyable object W.

Then, instantaneous attraction of the conveyable object W to the attractor means 12 of the attractor plate 32 attached to the lower end of the internal cylinder 28 by suction takes place, because the attractor means 12 has lain in vacuum communication via the attractor and head plates 32 and 24 with the suction hose means 22 that communicates with the suction source 16. Thus, the force of suction from the suction source 16 now becomes effective to attract the conveyable object W and to hold it attracted to the attractor suction means 12.

The conveyer arm 14 that carries the conveyable object B held by the attractor suction means 12 is now ready to be moved towards the conveying destination side B.

Then, while the conveyer arm 14 is being moved until it reaches the initial or mid position, the external cylinder 20 with the guide roller 34 thereof guided by the guide cam 44 is raised, together with the internal cylinder 28 in a manner reverse to the manner described, against or by the biasing force exerted thereon by the biasing means 18, until it reaches its upper limit position relative to the conveyer arm 14. FIG. 4 shows that the conveyable object W held attracted to the attractor suction means 12 is also lifted as the external cylinder 20 is raised together with the internal cylinder 28.

After the height h is reached with the conveyer arm 14 arriving at the mid position, the release guide cam 46 is controlling by which the release roller 36 attached to the internal cylinder 28 is guided to lower the internal cylinder 28.

As the internal cylinder 28 is lowered, the attractor plate 32 having the attractor means 12 fastened thereto descends and is detached from the head plate 24. The attractor plate 32 coming out of contact with the head plate 24 places the attractor suction means 12 under an atmospheric pressure and breaks its vacuum communication with the suction source 16 instantaneously. Thus, the force of suction that the attractor member 12 has possessed is removed, and its suction holding of the conveyable (conveyed) object W is released.

Here, the internal cylinder 28 is lowered and descends by a distance h (see FIGS. 1 and 4) of, say, around 60 mm, by or against the biasing force exerted thereon by the biasing means 26.

Also, the internal cylinder 28 descending as guided by the release guide cam 46 causes the release bar 48 to rotate or gyrate downwards centering on a mid point, as a fulcrum, of a plane below the rear surface of the attractor plate 32 in the direction of its width.

Here, the release bar 28 is pivoted with its base end fixed in position at a lower end of the fast or steady pin 30 secured to the head plate 24, it can be stated that the internal cylinder 28 when descending relative to the external cylinder 20 causes the release bar 48 supported by a lower end portion of the internal cylinder 28 and so supported normally to extend in a horizontal direction, to gyrate or on that base end clockwise, turning its free end downwards.

The so gyrating or turning release bar 48 causes its free end to hit on the conveyable object (now conveyed) W and assists in detaching it from the attractor means 12. The release of a conveyable (conveyed) object W from the suction attractor means 12 is thus ensured by the release bar 48.

The conveying operation for a conveyable object W or a cycle of the conveying operation for conveyable objects completes when the force of suction to the attractor means 12 is released and the conveyable object W having by suction attracted to the attractor means 12 is so released as mentioned above. The conveyer arm 14 may now be returned to the mid position between the conveying start side A and the conveying destination side B, as shown in FIG. 1.

If a plurality of conveyable objects W, e. g., paper made plates in a stack on the supply table 52, are to be processed, the conveyer arm 14 for attraction of a next conveyable object W is first returned to the mid position between the conveying start side A and the conveying destination side B, and the same process steps as mentioned above follow. In this way, a number of conveyable objects W in a stack on the table 52 can be processed (attracted and conveyed) successively, and thereby placed in a stack on the storing table 54.

While in the illustrated form of embodiment, a movement of the conveyer arm 14 for conveyance is described as effected by turning the conveyer arm about or with respect to a main shaft or spindle by means of a single drive motor to simplify the structure and the apparatus compact, the arrangement may be replaced by a construction in which the conveyer arm 14 are movable both vertically and horizontally on a base frame, or any other form.

Also, while the suction hose means 22 fastened to the head plate 24 and the attractor suction means 12 attached to the attractor plate 32 are shown and described as comprising the four (4) suction hoses and the four (4) attractor members, it will be obvious that they may not be limited so but may each be one or more of such.

Also, conveyable objects W as illustrated as paper made plates may be, for example, boards, substrates or chips as used in, e. g. computer technologies; they may be any objects which can be attracted by suction.

Also, the guide cam 44 and the release guide cam 46 illustrated that are used to guide the external and internal cylinders 20 and 28 to move downwards may each be a guide plate that is simply inclined downwards. Further, the shapes of the guides 44 and 46 may not be particularly limited to those illustrated.

Also, the attracting and conveying apparatus 10 shown and described for use to carry out the method of the present invention is not intended to impose limitations on its shape and configuration.

Figure 7:
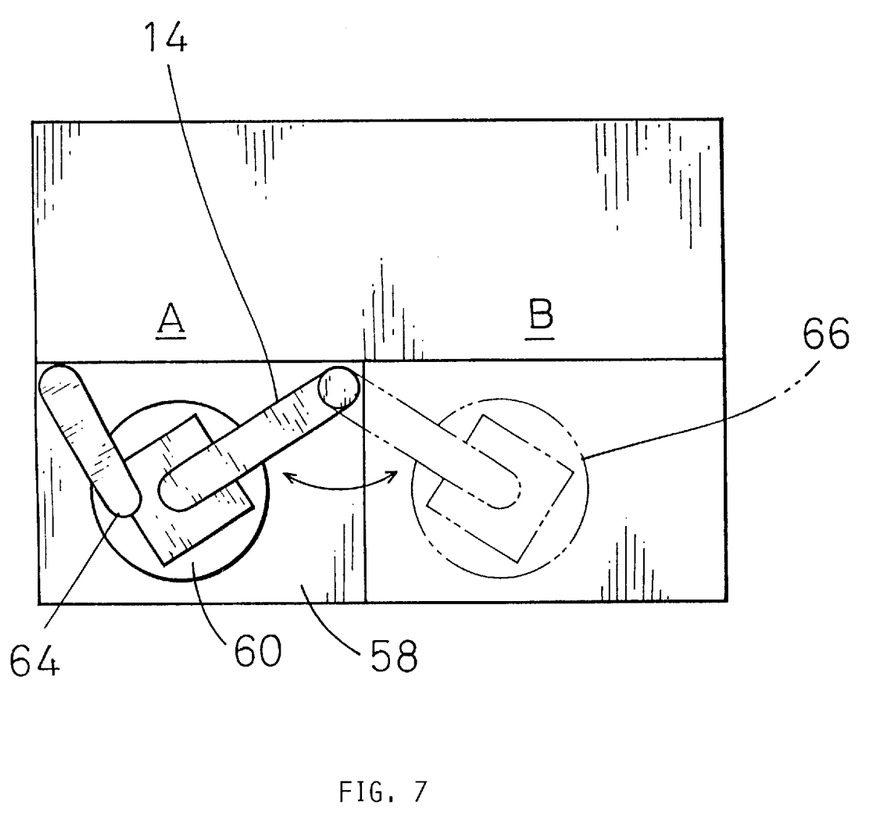
FIG. 7 is a top plan view that illustrates the checking system shown in FIG. 6.
Figure 8:
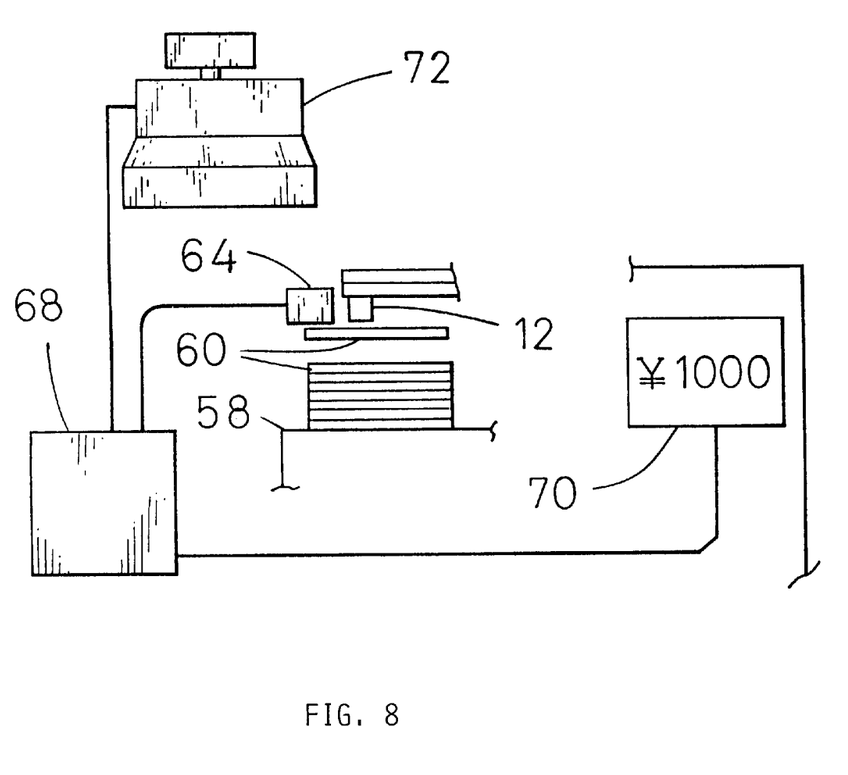
FIG. 8 is a front view, in part fragmentary, that illustrates the checking system shown in FIGS. 6 and 7.

Referring next to FIGS. 6 to 8, an explanation in detail is given in respect of a checking system for use in an eating establishment or restaurant in which conveyable objects W which are servable merchandise item plates 60 loaded with merchandise food items are offered to guests, and the merchandise item plates 60 consumed by the guests are placed one on top of another or in a stack or pile on a table in a plate conveying start side A, and then by using an attracting and conveying apparatus as described above are attracted by suction and conveyed one plate to the next to a plate destination side B where they are computed and checked.

The merchandise food item plates 60 for use here may advantageously be disposable paper made plates with rimless bottoms and identified and classified by colors and/or colored patterns.

The system S includes a sensor 64 disposed above a pile of merchandise item consumed plates 60 in the plate conveying start side A in the attracting and conveying apparatus 10 for reading colors, patterns or colored patterns (hereafter simply referred to as "colors") 62 of the plates 60. The system S is also provided in the plate destination side a storage casing 66 for storing the merchandise item plates 60 therein in a pile, which have been checked.

In the form of embodiment illustrated, the plate conveying start side A of the system S comprises a plate stacking table 58 that is designed to successively lift the plates 60 placed one on top of another thereon. The storage casing 66 in the plate conveying destination side B is shown to be a top open cylinder provided with a cushion spring (illustration omitted) therein whose upper surface is lowered each time a plate 60 checked is conveyed into the casing 66 to add to a pile of the plates 60 successively stored therein before in a snug pile.

The system further includes a computer 68 which is pre-stored with data for colors 62 of plates 60 for respective kinds and/or unit prices of merchandise food items loaded on the plates 60. The computer 68 is connected to the sensor 64 and is used to collate with those pre-stored data, data for the number of plates 60 for each of colors thereof read out by the sensor 64 for a given party guest to compute an amount to be charged to the guest.

For the computer 68 use can conveniently be made of a personal computer which also makes it possible to control ascending and descending movements of both the external and internal cylinders 20 and 28, development and removal of suction force to the attractor means 12 and so forth in the attracting and conveying apparatus 10 by permitting the conveyer arm 14 to be moved under control of the personal computer 68.

Shown also in FIGS. 6 and 8 are a charge display 70, a cash register 72 and a drive motor 74.

An explanation in detail is given in respect of a process of checking in an eating establishment, i. e., determining a charge to a guest for merchandise item plates consumed by the guest by using the checking apparatus illustrated above. The eating establishment here is typically a restaurant or shop with a rotary "sushi" bar in which "sushi" (vinegared rice with fish or vegetables in the form of rolls, slices, oval-shaped and others) items placed as servable merchandise food items on plates are offered to guests on a looped rotary conveyer (formed by a chain of serially connected crescent-shaped plates) table, a system commonly called a "crescent chain rotary catering table system".

The process may start with storing in the computer 68 data for colors 62 of merchandise item plates 60 for their respective kinds and/or unit prices. The merchandise item plates 60 have their particular classified colors determined by kinds and/or unit prices of the plates 60 loaded with particular merchandise food items so that those colors of the plates may identify the kinds and/or unit prices of the particular food items loaded thereon. The merchandise item plates 60 are then supplied onto a rotary catering table mounted on a base stand for conveying the merchandise food item loaded plates 60 around a loop of the rotary catering table and are thus offered to guests.

Guests take from the rotary catering table, plates 60 loaded with merchandise food items they like. After a guest consumes the plates 60, the guest or a service worker brings the plates consumed 60 to a place in the eating establishment where the checking system S is installed.

The guest's consumed merchandise item plates 60 are then successively placed one on top of another on the stacking table 58 that lies in the plate conveying start side A of the attracting and conveying apparatus 10 in the checking system S.

Then, an uppermost of the consumed merchandise item plates 60 so placed is approached by the attractor means 12 at the lower end portion of the conveyer arm 14 and is attracted by suction to and held by the attractor means 12 which exerts the suction force produced by the suction source 16, and movement of the conveyer arm 14 towards the plate conveying destination side B then follows.

Then, the sensor 64 disposed above the merchandise item plates 60 reads the color 62 of the merchandise item plate 60 held attracted to the suction attractor means 12, to transmit data therefor to the computer 68.

Next, the merchandise item plate 60 with its color read by the sensor 64 is moved by the conveyer arm 14 into the plate storage casing 66 in the plate conveyance destination side B to add therein to an existing snug pile of plates 60 that were conveyed successively.

In this step, since the attractor plate 32 having the attractor suction means 12 fastened thereto is detached in a moment from the head plate 24 in vacuum communication with the suction source 16 to release the suction force and render it ineffective for the attractor means 12 to attract, the consumed merchandise item plate 60 instantaneously comes off the attractor means 16 and is allowed to fall into the plate storage casing 66.

In the manner described, a plurality of merchandise item plates 60 placed one on top of another on the placement table 58 are successively attracted by suction to and retained by the attractor means 12 and conveyed therewith by the conveyer arm 14 towards and into the storage casing 66. The colors 62 of all the merchandise item plates 60 placed one on top of another are read one by one by the sensor 64, and all the data therefor, i. e., data for the numbers of the consumed merchandise item plates 60 classified by their colors, are transmitted to the computer 68.

The computer 68 then collates these data with the pre-stored data for colors of merchandise items for their respective kinds and unit prices, and determines a charge for consumed merchandise item plates 60 of each of different particular kinds and/or unit prices classified and individually identified by colors, and then a total charge thereof.

The total charge determined by the computer 68 is then indicated at the charge display 70 and also indicated at the cash register 72.

This enables the charge to be noticed to a cashier at the cash register 72, and also to the guest and the service worker at the charge display 70. The guest may then pay for the charge at the cashier.

It thus becomes possible for each guest to pay for its charge outright without being kept waiting at the cashier, in contract to the conventional practice that guests must be kept waiting for long at a cashier.

Also, a service worker may take out the storage casing 66 in which a given large number of consumed merchandise item plates 60 have been stored, as a disposable collection of consumed merchandise item plates 60 which have been paid for. Since the storage casing 66 contains a collection of such merchandise item plates placed snugly one on top of another with a minimum total volume, the collection can be thrown away into a trash direct or as contained in a garbage bag. A trouble so far met to compress the volume of a garbage of this sort which has hitherto become unnecessarily large when it is disposed or thrown away is thus eliminated altogether. In addition, it serves to reduce total volumes of masses of garbage and to resolve environmental problems.

Also, if merchandise item plates are not paper made or disposable but are plates or pieces of china or plastic ware reusable, storing them in the storage casing 66 permits them in it to be cleaned together as a unit for reuse in the next time.

It should be noted that while as illustrated the sensor 64 is located above the plate conveying start side A in the checking system, the same may be located above the storage casing 66 or above a path of the movement of the conveyer arm 14.

Also, while as illustrated the color 62 is applied to each individual merchandise item plate 60 along an annular rim on its top surface, the same may alternatively be applied to the entire surface of the individual plate 60, or to a rear surface of the plate 60. These alternative permits reading (identifying) the plate 60 by the color 62 from below the plate 60 and thus not only locating the sensor 64 below the merchandise item plate 60 but also identifying the plate 60 simply by moving the conveyer plate 14 towards the sensor 64 without the need to lift the suction attractor means 12 up and down. This allows the system S to be made even more compact.

Also, even with the charge display 70 not provided for, a guest can be notified at the cashier of its charge that the computer 68 determines and displays on the cash register 72, and the conventional problem of standing guests up for long at the cashier is thereby enough resolved.

Also, while as illustrated the servable merchandise items are exemplified as "sushi" items which are directly loaded or placed on merchandise item plates and thereby offered to guests in a rotary catering table system, a servable merchandise food items may also be "donburi-mono" (a dish served in a bowl) or "menrui" (a noodle dish) in which a cooked food is offered or served as contained in a receptacle. It can readily be seen that the checking system and system according to the present invention are applicable to such dishes as merchandise items as well by offering or serving them as placed on plates 60.

INDUSTRIAL APPLICABILITY

A method of and an apparatus for attracting and conveying conveyable objects makes use of an arrangement in which head plate disposed at a lower end portion of an external cylinder and an attractor plate having an attractor means and disposed at a lower end portion of an internal cylinder received in the external cylinder are brought into a close or vacuum contact with each other when a conveyable object is being attracted by suction to the attractor means, and the close or vacuum contact is caused to break to bring pressure in the attractor means to an atmospheric level when the conveyed object held attracted is being released from the attractor means, the arrangement permitting the conveyed object held attracted to be released instantaneously and providing for an excellent suction retention releasability.

Also, effecting conveyance movement of a conveyer arm and motions to cause the attractor means mechanically by means of biasing means and cam roller and guide cam means renders the apparatus structure extremely simple and the apparatus itself compact to the extent that the cost of installation and its running cost are drastically reduced.

Also, a release bar may be included that is axially supported to normally extend essentially horizontally with its base and mid portions lying on a plane below the rear surface of the attractor plate and at positions corresponding to one end and midway of the rear surface of the attractor plate in the direction of its width, the release bar having its free end portion extending from the other end of the rear surface of the attractor plate in the direction of its width. Designed so that such a release bar may turn, gyrate or rotate on a mid point, as fulcrum, of the plane below the rear surface of the attractor plate to cause the above free end portion to hit on a conveyed object being detached, the release bar is found to aid its detachment from the attractor means and thus to ensure an instantaneous release of its retention by suction to the attractor means.

Also, a checking process and system in an eating establishment according to the present invention is provided that makes use of an attracting conveying apparatus as described pre-stores colors or colored patterns imparted to merchandise item plates for their respective kinds and/or unit prices. Merchandise items consumed by a guest are placed one on top of another in the plate conveying start side of the plate attracting and conveying apparatus and are allowed to be conveyed one by one with the conveyer arm. A sensor is used to read colors or colored patterns of successive merchandise item plate being conveyed. The sensor and a computer produce data for the number of merchandise item plate of each of particular kinds and/or unit prices classified or differentiated by colors or colored patterns. All such data are collated by the computer with the data pre-stored therein for colors or colored patterns imparted to merchandise item plates for their respective kinds and/or unit prices to determine an amounts of charge for offered and served merchandise item plates of each of the colors or colored patterns consumed by the guest and to compute from such amounts a total charge for all the merchandise items offered and served. The determination and computation are and hence a checking is accomplished in a moment.

Thus, the system also totally eliminates the loads on service workers in an eating establishment to classify and then compute different consumed dishes individually and sharply reduces job requirements entailed in checking in an eating establishment.

Also, providing a storage casing or container in the plate conveying destination side for loading with consumed and conveyed merchandise item plates as placed one on top of another eliminates altogether a service worker's requirement to dispose consumed merchandise item plates paid for individually. In addition, the ability of the system to allow consumed merchandise item plates to be laid snugly one on top of another in the storage casing enables these consumed plates to be thrown away into a trash or a garbage bag in a sufficiently small volume. It also eliminates altogether the troubles so far met to compress the volume of a garbage of this sort which has hitherto become unnecessarily large when it is disposed or thrown away is thus eliminated altogether. In addition, it serves to reduce total volumes of masses of garbage and to resolve environmental problems.

Although the present invention has been described hereinbefore in terms of the presently preferred forms of embodiments, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as compassing all alterations, modifications, or alternative applications as fall within the true spirit and scope of the invention.

What is claimed is:

1. A checking process in an eating establishment, comprising the steps of:
    a) providing merchandise item plates (60) on surfaces thereof with colors, patterns or colored patterns (62) that identify at least one of kinds and prices of merchandise items for loading thereon;
    b) pre-storing in a computer (68) data for the colors, patterns or colored patterns (62) of merchandise item plates (60) in relation to said at least one of their kinds and prices respectively;
    c) loading the merchandise item plates (60) of colors, patterns colored patterns with merchandise items whose kinds said at least one of and prices are identified by the colors, patterns and colored patterns (62), thereby offering the merchandise items (60);
        for checking by a guest paying a charge for merchandise item plates (60) the guest consumed,
    d) placing the consumed merchandise item plates (60) one on top of another in a plate conveying start side (A);
    e) causing an attractor means (12) carried by a conveyer arm (14) to attract by suction thereto each of the consumed merchandise item plates (60) so placed;
    f) causing the conveyer arm (14) to convey the consumed merchandise item plate (60) held attracted and retained by the attractor means (12) from the plate conveying start side (A) towards a plate conveying destination side (B);
    g) in the plate conveying destination side (B), releasing the consumed merchandise item plate (60) conveyed from suction retention by instantaneously removing suction at the attractor means (12) to permit the released merchandise item plate (60) to detach from the attractor means (12);
    h) during the steps e), f) and g), reading with a sensor (64) a color, pattern or colored pattern of the consumed merchandise item plate (60);
    i) repeating the steps e) to h) for all the consumed merchandise item plates (60) in the plate conveying start side (A); and
    j) in the computer (68), storing data for the colors, patterns or colored patterns (62) read by the sensor (64) and collating the stored data with the pre-stored data for the colors, patterns and colored patterns (62) of merchandise item plates (60) in relation to said at least one of their kinds and prices to determine the number and the charge of the consumed merchandise item plates (60) for each of said at least one of the kinds and prices, and to compute a total charge therefrom.

2. A checking process in an eating establishment as set forth in claim 1, further comprising the step of k) disposing a storage casing (66) in the plate conveying destination side (B) for accepting the consumed merchandise item plates (60) detaching in the step g) so that they are placed snugly one on top of another in the casing (66).

3. A checking system in an eating establishment, comprising:
    merchandise item plates (60) provided with colors, patterns or colored patterns (62) that identify merchandise items for loading thereon;
    an attractor means (12) carried by a conveyer arm (14) for attracting by suction each of the consumed merchandise item plates (60) to permit the conveyer arm (14) to convey the consumed merchandise item plate (60) held retracted by suction to and retained by the attractor means (12) from a plate conveying start site (A) to a plate conveying destination side (B);
    a suction removal means associated with the conveyer arm (14) and operable at the plate conveying destination site (B) to instantaneously remove suction to the attractor means (12) to permit the consumed merchandise item plate conveyed to detach from the attractor means and to fall;
    a sensor means (64) associated with the conveyer arm (14) for sensing the colors, patterns or colored patterns (62) of the merchandise item plates (60); and
    a computer (68) for pre-storing data for colors, patterns or colored patterns (62) of merchandise item plates (60) in relation to at least one of their kinds and prices respectively, the computer (68) being associated with the sensor means (64) for storing data for the colors, patterns or colored patterns (62) sensed by the sensor means (64) and collating the stored data with the pre-stored data for colors, patterns or colored patterns (62) of merchandise item plates (60) in relation to said at least one of their kinds and prices to compute the number of the consumed merchandise item plates (60) for each of at least one of kinds and prices corresponding to the colors, patterns or colored patterns (62) sensed by the sensor means (64) and to determine from such charges a total charge to be billed to the guest.

4. A checking system in an eating establishment as set forth in claim 3, further comprising a storage casing (66) disposed to lie in the plate conveying destination site (B) for accepting consumed merchandise item plates (60) each conveyed by the conveyer arm (14) and detached from the attractor means (12) in a manner such that the plates (60) are placed snugly one top of another in the storage casing (66).

* * * * *